US012795777B2

(12) United States Patent
Dong

(10) Patent No.: US 12,795,777 B2
(45) Date of Patent: Nov. 10, 2026

(54) LINK CONTROL METHODS AND APPARATUSES, AND STORAGE MEDIA

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 317 days.

(21) Appl. No.: 18/576,794

(22) PCT Filed: Jul. 5, 2021

(86) PCT No.: PCT/CN2021/104564
§ 371 (c)(1),
(2) Date: Jan. 5, 2024

(87) PCT Pub. No.: WO2023/279243
PCT Pub. Date: Jan. 12, 2023

(65) Prior Publication Data

US 2025/0098026 A1 Mar. 20, 2025

(51) Int. Cl.
*H04W 76/34* (2018.01)
*H04B 17/318* (2015.01)

(52) U.S. Cl.
CPC .......... *H04W 76/34* (2018.02); *H04B 17/318* (2015.01)

(58) Field of Classification Search
CPC ..... H04W 76/34; H04W 76/15; H04W 76/30; H04W 24/08; H04B 17/26; H04B 17/318
See application file for complete search history.

(56) References Cited

U.S. PATENT DOCUMENTS

| | | | | |
|---|---|---|---|---|
| 7,633,910 | B2 | 12/2009 | Zhun et al. | |
| 2005/0071476 | A1* | 3/2005 | Tejaswini | H04W 8/22 709/227 |
| 2006/0227731 | A1 | 10/2006 | Shun et al. | |
| 2015/0257116 | A1 | 9/2015 | Frantti | |
| 2016/0073316 | A1* | 3/2016 | Calcev | H04W 36/0066 370/332 |
| 2021/0385692 | A1* | 12/2021 | Kwon | H04W 28/24 |

(Continued)

FOREIGN PATENT DOCUMENTS

| | | | |
|---|---|---|---|
| CN | 1781281 | A | 5/2006 |
| CN | 103188801 | A | 7/2013 |

(Continued)

OTHER PUBLICATIONS

ISA State Intellectual Property Office of the People's Republic of China, International Search Report Issued in Application No. PCT/CN2021/104564, Apr. 2, 2022, WIPO, 2 pages.

*Primary Examiner* — Mohamed A Kamara
(74) *Attorney, Agent, or Firm* — Volpe Koenig

(57) ABSTRACT

A link control method, apparatus and storage medium that improves spectrum utilization in a wireless network. The utilization of the spectrum is improved by: receiving a communication frame sent from a first station (STA) in a first link; and in response to determining that a signal strength RSSI value is lower than a first RSSI threshold, sending a disassociation frame to the first STA, wherein the first RSSI threshold is an RSSI threshold corresponding to the first link, and the disassociation frame is at least for disassociating the first AP from the first STA in the first link.

18 Claims, 6 Drawing Sheets

(56) References Cited

U.S. PATENT DOCUMENTS

| | | | | |
|---|---|---|---|---|
| 2023/0156840 | A1* | 5/2023 | Chitrakar | H04W 76/14 370/329 |
| 2023/0300773 | A1* | 9/2023 | Klein | H04W 60/04 370/329 |

FOREIGN PATENT DOCUMENTS

| | | | |
|---|---|---|---|
| CN | 104969635 | A | 10/2015 |
| CN | 108834167 | A | 11/2018 |

* cited by examiner

LINK CONTROL METHODS AND APPARATUSES, AND STORAGE MEDIA

CROSS-REFERENCE TO RELATED APPLICATION

The present application is a U.S. National Stage of International Application No. PCT/CN2021/104564, filed on Jul. 5, 2021, the contents of which are incorporated herein by reference in their entirety for all purposes.

TECHNICAL FIELD

The present disclosure relates to the field of communications, and in particular, to link control methods and apparatuses, and storage media.

BACKGROUND

For IEEE (Institute of Electrical and Electronics Engineers) 802.11, an IEEE802.11be Study Group (SG) was established to study the next generation of major Wi-Fi (Wireless Fidelity) technology, e.g., 802.11a/b/g/n/ac. The scope of research includes: 320 MHz (megahertz) bandwidth transmission, multiple frequency band aggregation and synergy, etc. The proposed vision includes improving the rate and throughput relative to that in the existing 802.11ax by at least four times. The main application scenarios are video transmission, Augmented Reality (AR), Virtual Reality (VR), and so on. The aggregation and cooperation of multiple frequency bands (connections/links) refers to the communication between devices (refers to the terminal devices) in the frequency bands of 2.4 GHz (gigahertz), 5 GHz and 6-7 GHz at the same time. For devices to communicate in multiple frequency bands at the same time, a new MAC (Media Access Control) mechanism needs to be defined to carry on the management. In addition, another vision of IEEE802.11be is to support low latency transmission.

In 802.11be, a maximum supported bandwidth is 320 MHz (160 MHz+160 MHz), followed by 240 MHz (160 MHz+80 MHz), with the possibility of defining the bandwidth supported in 802.11ax in the future.

SUMMARY

To overcome the problems in the related technology, embodiments of the present disclosure provide link control methods and apparatuses, and storage media.

According to a first aspect of the present embodiments of the present disclosure, a link control method is provided, the method is performed by a first wireless access point (AP), the first AP being one AP affiliated to an AP multi-link device (MLD), the method comprising:

receiving a communication frame sent from a first station (STA) in a first link; and in response to determining that a signal strength RSSI value is lower than a first RSSI threshold, sending a disassociation frame to the first STA, wherein the first RSSI threshold is an RSSI threshold corresponding to the first link, and the disassociation frame is at least for disassociating the first AP from the first STA in the first link.

According to a second aspect of the present embodiments of the present disclosure, a link control method is provided, which is performed by a first station (STA), the method comprising:

sending a communication frame to a first wireless access point (AP) in a first link, the first AP being any one AP affiliated to an AP multi-link device (MLD); and in response to receiving a disassociation frame from the first AP in the first link, disassociating from the first AP in the first link based on the disassociation frame.

According to a third aspect of the present embodiments of the present disclosure, a computer-readable storage medium is provided, the computer-readable storage medium storing a computer program, which is used to implement the link control method according to any one of the first aspect.

According to a fourth aspect of the present embodiments of the present disclosure, a computer-readable storage medium is provided, the computer-readable storage medium storing a computer program, which is used to implement the link control method according to any one of the second aspect.

According to a fifth aspect of the present embodiments of the present disclosure, a link control apparatus is provided, comprising:

a processor; and a memory, configured to store instructions executable by the processor;

wherein the processor is configured to execute any one of the link control methods according to the first aspect.

According to an sixth aspect of the present embodiments of the present disclosure, a link control apparatus is provided, comprising:

a processor; and a memory, configured to store instructions executable by the processor;

wherein the processor is configured to execute any one of the link control methods according to the second aspect.

It should be understood that the above general description and the following detailed description are merely exemplary and explanatory and do not limit the disclosure.

BRIEF DESCRIPTION OF DRAWINGS

The figures herein are incorporated into the specification and constitute a part of the specification, illustrate embodiments in accordance with the present disclosure, and are used together with the specification to explain the principle of the present disclosure.

DETAILED DESCRIPTION

Figure 1:
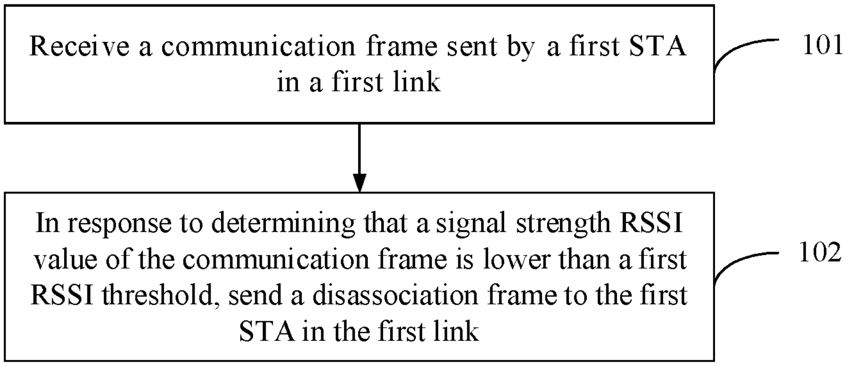
FIG. 1 is a schematic flowchart illustrating a link control method according to an exemplary embodiment.

Exemplary embodiments will be described in detail here, and examples thereof are illustrated in the accompanying figures. When the following description refers to the accompanying figures, unless indicated otherwise, the same reference signs in different figures designate the same or similar elements. Implementation manners described in the following exemplary embodiments do not represent all implementation manners consistent with the present invention. Rather, they are merely examples of devices and methods consistent with some aspects of the present invention as set forth in the appended claims.

The terms used in the present disclosure are only for the purpose of describing specific embodiments, and are not intended to limit the present disclosure. The singular forms "a", "said" and "the" used in the present disclosure and appended claims are also intended to include plural forms, unless the context clearly indicates other meanings. It should also be understood that the term "and/or" used herein refers to and includes any or all possible combinations of one or more associated listed items.

It should be understood that although the terms "first," "second," "third," etc., may be used in this disclosure to describe various information, the information should not be limited to these terms. These terms are only used to distinguish information of same type from each other. For example, without departing from the scope of the present disclosure, first information may also be referred to as second information, and similarly, the second information may also be referred to as the first information. Depending on the context, the word "if" as used herein can be interpreted as "when," "upon," or "in response to determination."

At present, for 802.11ax, in a 6 GHz frequency band (or link), if an access point (AP) receives any communication frame or any (re) association request frame from a station (STA), and if an RSSI (Received Signal Strength Indication) value of the frame is below a threshold, the AP sends a disassociation frame to the STA. In 802.11be, since the devices support multi-link communication, when an AP disassociates multiple links, the AP sends a disassociation frame to an STA, where the disassociation frame is at a Multi-Link Device (MLD) level. For example, according to the existing 802.11be description, if an AP receives a communication frame in a 6 GHz link below an RSSI threshold, the AP sends the disassociation frame to disassociate from the STA; and since the disassociation is at the MLD level, even if received frames from the other links meet corresponding RSSI thresholds, the other links will be disassociated, which is not conducive to the power saving of the device (re-establish multiple links are needed), and also not conducive to the spectrum utilization.

For example, an AP MLD may include three affiliated APs, e.g., AP1, AP2, and AP3, and the three affiliated APs work at different links. A non-AP MLD may include three affiliated STAs, e.g., STA1, STA2, and STA3. In this case, the AP MLD establishes multi-links with the non-AP MLD, e.g., a communication link, e.g., link1, between AP1 and STA1 corresponding to a 2.4 GHz frequency band, a communication link, e.g., link2, between AP2 and STA2 corresponding to a 5 GHz frequency band, and a communication link, e.g., link3, between AP3 and STA3 corresponding to a 6 GHz frequency band. If AP3 receives a reassociation request frame from STA3 and AP3 determines that an RSSI value of the reassociation request frame is less than an RSSI threshold, AP3 sends a disassociation frame. The disassociation frame not only releases the relationship of link 3 between AP3 and STA3 in the 6 GHz frequency band, but also simultaneously releases the relationship of link 1 between AP1 and STA1 in the 2.4 GHz frequency band, and releases the relationship of link2 between AP2 and STA2 in the 5 GHz frequency band. In this example, it is only expected that the association relationship between AP3 and STA3 under the 6 GHz band of link3 is unlinked, and it is not expected that the association relationship between AP1 and STA1 under the 2.4 GHz band and the association relationship between AP2 and STA2 under the 5 GHz band are unlinked, which is not conducive to the power saving of the device, and also is not conducive to the effective use of the spectrum.

In order to solve this problem, the present disclosure provides a link control scheme that can effectively solve the above mentioned problem of MLD-level disassociation for multiple links, so that the STA can work normally under other link(s), and improve the spectrum utilization.

In embodiments of the present disclosure, a first AP may send a disassociation frame to a first STA in a first link upon determining that a signal strength RSSI value of a communication frame received in the first link is lower than a first RSSI threshold. The RSSI thresholds involved in the embodiments of the present disclosure all belong to the link level, where the first RSSI threshold is a preset RSSI threshold at the link level corresponding to the current first link, i.e., the first RSSI threshold corresponds only to the first link. And subsequently, if association relationship(s) between the AP(s) and the STA(s) is to be released, an association relationship between an AP and an STA in a corresponding link will be disassociated according to an RSSI threshold at the link level, and the association relationships for all links will not be released. In this way, the problems caused by the disassociation frame used to release the association relationship at the MLD level are overcome, the STA can work normally across the links in other frequency bands, and the spectrum utilization is improved.

The link control method provided by the present disclosure is first described below from the AP side.

Embodiments of the present disclosure provide a link control method that can be used for a first wireless AP, where the first AP is affiliated to an AP MLD. Affiliated APs in the AP MLD can communicate with different STAs via multiple concurrent communication links, and the affiliated APs have different bandwidths, for example, communicating with STA1 via a 2.4 GHz communication link, communicating with STA2 via a 5 GHz communication link, and communicating with STA3 via a 6 GHz communication link. The multiple communication links combine to form the AP MLD. Each communication link corresponds to an affiliated AP, and in this disclosure, the first AP and a subsequent second AP are affiliated to the AP MLD.

FIG. 1 is a flowchart of a link control method illustrated according to an embodiment, which may be performed by a first AP, the first AP is an AP affiliated to an AP MLD. The method may include the following steps.

At step 101, a communication frame sent by a first STA in a first link is received.

In embodiments of the present disclosure, the first link is a link between the first AP and the first STA, and optionally may correspond to a 6 GHz frequency band. The communication frame may be any frame, such as a data frame or a signaling frame, or the communication frame may also refer to a (re) association request frame.

At step 102, in response to determining that a signal strength RSSI value of the communication frame is lower than a first RSSI threshold, a disassociation frame is sent to the first STA in the first link.

The RSSI threshold(s) involved in the embodiments of the present disclosure all belong to a link level. The first RSSI threshold is a preset RSSI threshold at a link level corresponding to the first link, i.e., the first RSSI threshold corresponds only to the first link. If an association relationship between an AP and an STA is to be released, only the association relationship between the AP and the STA in a corresponding link will be released according to the RSSI threshold at the link level, and will not release all links. Optionally, an RSSI threshold corresponding to the 6 GHz frequency band may be pre-agreed in the protocol, and the pre-agreed RSSI threshold is taken as the first RSSI threshold.

The disassociation frame sent by the first AP to the first STA in the first link is used to at least release a relationship between the first AP and the first STA in the first link. Optionally, the disassociation frame is used to disassociate the first AP from the first STA in the 6 GHz frequency band.

In the above embodiments, the problem of disassociating multiple links at the MLD level can be effectively solved, enabling the STA to work normally in other links, and improving the spectrum utilization.

In some optional embodiments, the disassociation frame is further used to disassociate a second AP from a second STA in a second link, where the second AP is one or more APs affiliated to the AP MLD and different from the first AP.

In this embodiment, the AP may send a disassociation frame on the first link, which may be used to disassociate the first AP from the first STA on the first link in addition to disassociate the second AP from the second STA on the second link. AP signaling resources are saved and availability is high.

In some optional embodiments, the disassociation frame includes: a reason code for indicating lower than the first RSSI threshold and an identification of the first link.

Figure 2A:
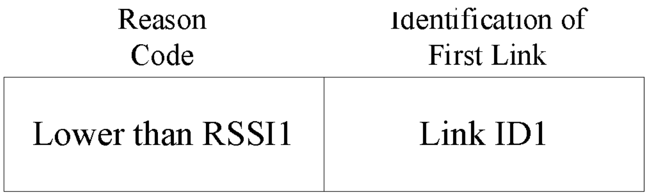
FIG. 2A is a schematic diagram illustrating a structure of a disassociation frame according to an exemplary embodiment.

Accordingly, a structure of the disassociation frame is shown with reference to FIG. 2A. The disassociation frame carries a reason code indicating lower than the first RSSI threshold, and an identification of the first link. The first STA may determine, based on the identification of the first link, that the first link is to be disassociated, as well as determine, based on the reason code, that the reason for disassociating the first link is that the RSSI value of the communication frame received by the first AP is less than the first RSSI threshold.

In some optional embodiments, the disassociation frame may include, in addition to the reason code for indicating lower than the first RSSI threshold and the identification of the first link, a reason code for indicating lower than a second RSSI threshold and an identification of the second link, where the second RSSI threshold is a preset RSSI threshold corresponding to the second link.

Figure 2B:
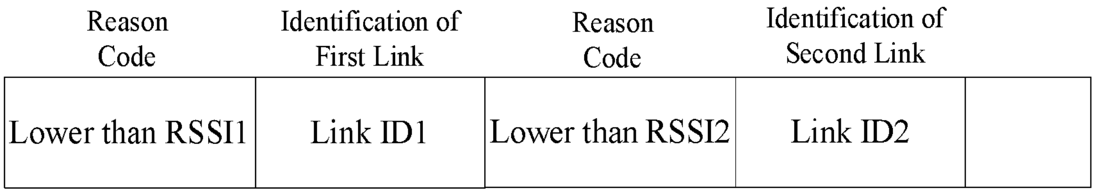
FIG. 2B is a schematic diagram illustrating another structure of a disassociation frame according to an exemplary embodiment.

Accordingly, a structure of the disassociation frame is shown with reference to FIG. 2B. The disassociation frame further carries a reason code indicating lower than the second RSSI threshold, and an identification of the second link, where the second RSSI threshold is a preset RSSI threshold corresponding to the second link. The number of second APs may be one or more, the present disclosure is not limited thereto.

In the embodiment, the link(s) to be released and the reason for releasing the link(s) can be indicated in the disassociation frame by the separate reason code(s) and the corresponding link identification(s), which saves signaling resources of the AP and has high availability.

In some optional embodiments, the disassociation frame includes: a reason code for indicating lower than preset RSSI threshold(s) corresponding to link(s), and a link identification set.

Figure 2C:
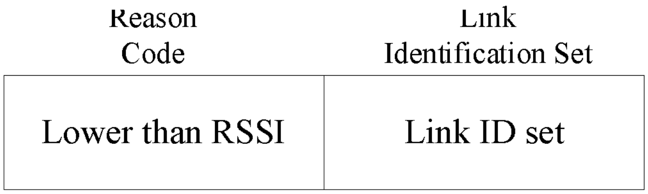
FIG. 2C is a schematic diagram illustrating another structure of a disassociation frame according to an exemplary embodiment.

Accordingly, a structure of the disassociation frame is shown with reference to FIG. 2C.

In a possible implementation manner, the bits in the link identification set correspond one-to-one with the identifications of the links, and when a bit value of any one of the bits is a preset value, it means disassociating the AP from the STA in the corresponding link.

Optionally, the preset value may be “1” or “0”, and the present disclosure does not limit this.

For example, the preset value is “1”, and the link identification set includes 3 bits corresponding to the first link between the first AP and the first STA, the second link #1 between the second AP #1 and the second STA #1, and the second link #2 between the second AP #2 and the second STA #2, i.e., the number of the second links in this embodiment is 2. Assuming that the bit values of the 3 bits of the link identification set are 1, 0, 1 in sequence, the disassociation frame is used to indicate that it disassociates the first AP from the first STA in the first link, disassociates the second AP #2 from the second STA #2 in the second link #2, and does not disassociate the second AP #1 from the second STA #1 in the second link #1.

In the above embodiment, the structure of the disassociation frame can be further simplified, thereby saving the number of resources occupied by the disassociation frame, realizing simplicity, and having high usability.

Figure 3:
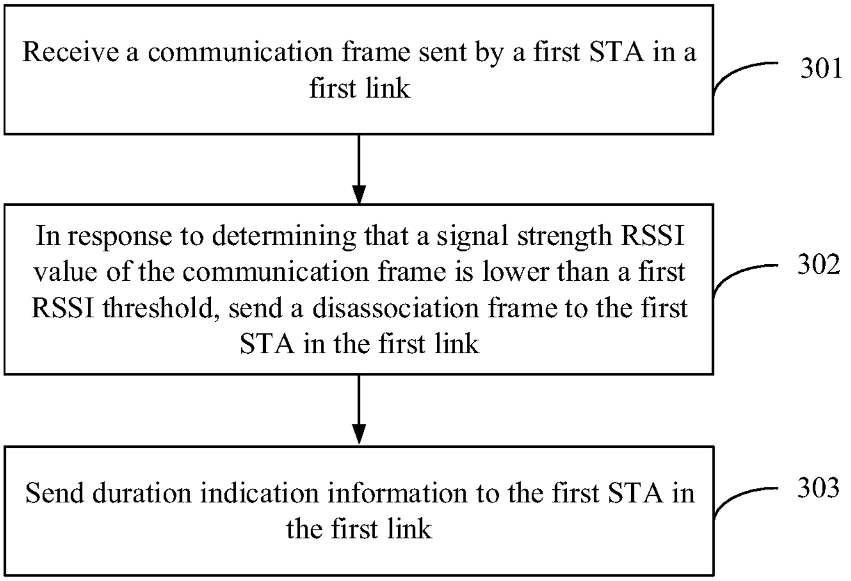
FIG. 3 is a schematic flowchart illustrating another link control method according to an exemplary embodiment.

In some optional embodiments, with reference to FIG. 3, which is a flowchart of a link control method illustrated according to an embodiment, the method may be applied to a first AP and may include the following steps.

At step 301, a communication frame sent by a first STA in a first link is received.

In the embodiments of the present disclosure, the communication frame specifically refers to a reassociation request frame.

At step 302, in response to determining that a signal strength RSSI value of the communication frame is lower than a first RSSI threshold, a disassociation frame is sent to the first STA in the first link, where the first RSSI threshold is a preset RSSI threshold corresponding to the first link, and the disassociation frame is used to release, at least, an association relationship between the first AP and the first STA in the first link.

At step 303, in the first link, duration indication information is sent to the first STA.

In the embodiments of the present disclosure, the duration indication information is used to indicate a length of an interval for sending the reassociation request frame again. The first AP may send the duration indication information to the first STA, so that the first STA re-sends the reassociation request frame to the first AP again at least after the length of the interval.

In the above embodiments, the first AP may also send the duration indication information to the first STA, so that the first STA re-transmits the reassociation request frame, improving the spectrum utilization.

The link control method provided by the present disclosure is described below again from the STA side.

Figure 4:
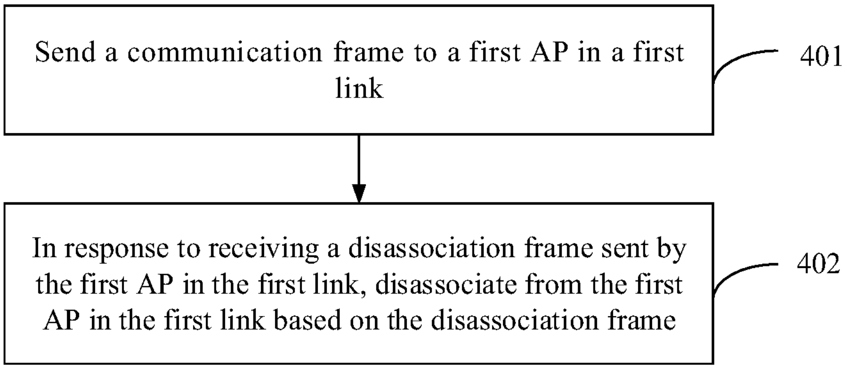
FIG. 4 is a schematic flowchart illustrating another link control method according to an exemplary embodiment.

Embodiments of the present disclosure provide a link control method, as shown with reference to FIG. 4, which is a flowchart of a link control method illustrated according to an embodiment. The method may be performed by a first STA, and may include the following steps.

At step 401, a communication frame is sent to a first wireless AP in a first link, where the first AP is one AP affiliated to an AP MLD.

In embodiments of the present disclosure, the communication frame may be any frame, such as a data frame or a signaling frame, or the communication frame may be a reassociation request frame.

At step 402, in response to receiving a disassociation frame sent by the first AP in the first link, based on the disassociation frame, the first STA disassociates from the first AP in the first link. In the above embodiments, the first STA may release the relationship with the first AP on the first link based on the disassociation frame. Thus, the problem caused by using the disassociation frame for releasing the association relationship at the MLD level is solved, the STA can work normally via links in other frequency bands, and the spectrum utilization rate is improved.

In some optional embodiments, the disassociation frame is further used to disassociate a second AP from a second STA in a second link, where the second AP is one or more APs affiliated to the AP MLD and different from the first AP.

In a possible implementation manner, the disassociation frame at least includes: a reason code for indicating lower than the first RSSI threshold, and an identification of the first link, as shown in FIG. 2A.

In another possible implementation manner, the disassociation frame includes: a reason code for indicating lower than the first RSSI threshold and an identification of the first link; and reason code(s) for indicating lower than second RSSI threshold(s) and identification(s) of the second link(s), where the second RSSI threshold(s) may be preset RSSI threshold(s) corresponding to the second link(s), as shown in FIG. 2B.

In another possible realization, the disassociation frame includes: a reason code for indicating lower than preset RSSI threshold(s) corresponding to link(s), and a link identification set, as shown in FIG. 2C.

In the case where the structure of the disassociation frame is adopted as shown in FIG. 2C, the first STA disassociates from the first AP in the first link in response to determining that a bit value of a bit corresponding to the first link in the link identification set is a preset value.

The preset value may be "1" or "0", and the present disclosure does not limit this.

Figure 5:
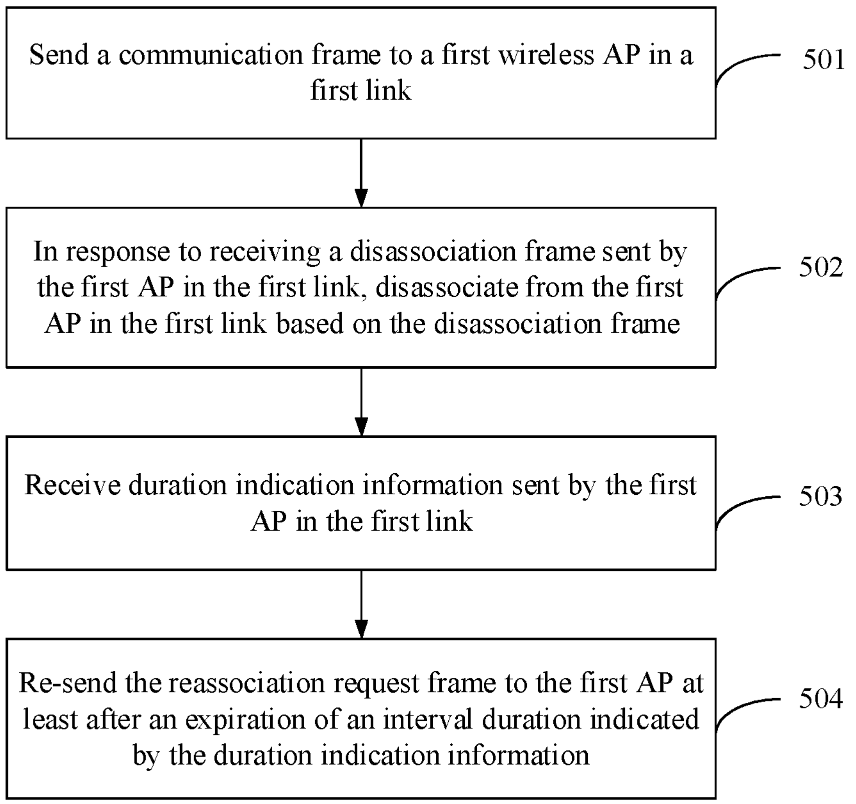
FIG. 5 is a schematic flowchart illustrating another link control method according to an exemplary embodiment.

In some optional embodiments, referring to FIG. 5, which is a flowchart of a link control method illustrated according to an embodiment, the method may be applied to the first STA, and may include the following steps.

At step 501, a communication frame is sent to the first wireless AP in the first link.

In embodiments of the present disclosure, the communication frame can be a reassociation request frame. The first AP is an AP affiliated to an AP MLD.

At step 502, in response to receiving a disassociation frame sent by the first AP in the first link, the first STA disassociates from the first AP in the first link based on the disassociation frame.

At step 503, duration indication information sent by the first AP in the first link is received.

At step 504, at least after an expiration of an interval duration indicated by the duration indication information, the reassociation request frame is re-sent to the first AP.

In the above embodiment, the first STA may, based on the indication from the first AP, send the reassociation request frame to the first AP again after an interval of the interval duration, so as to re-establish the relationship with the first AP in the 6 GHz frequency band, which has high availability.

Figure 6:
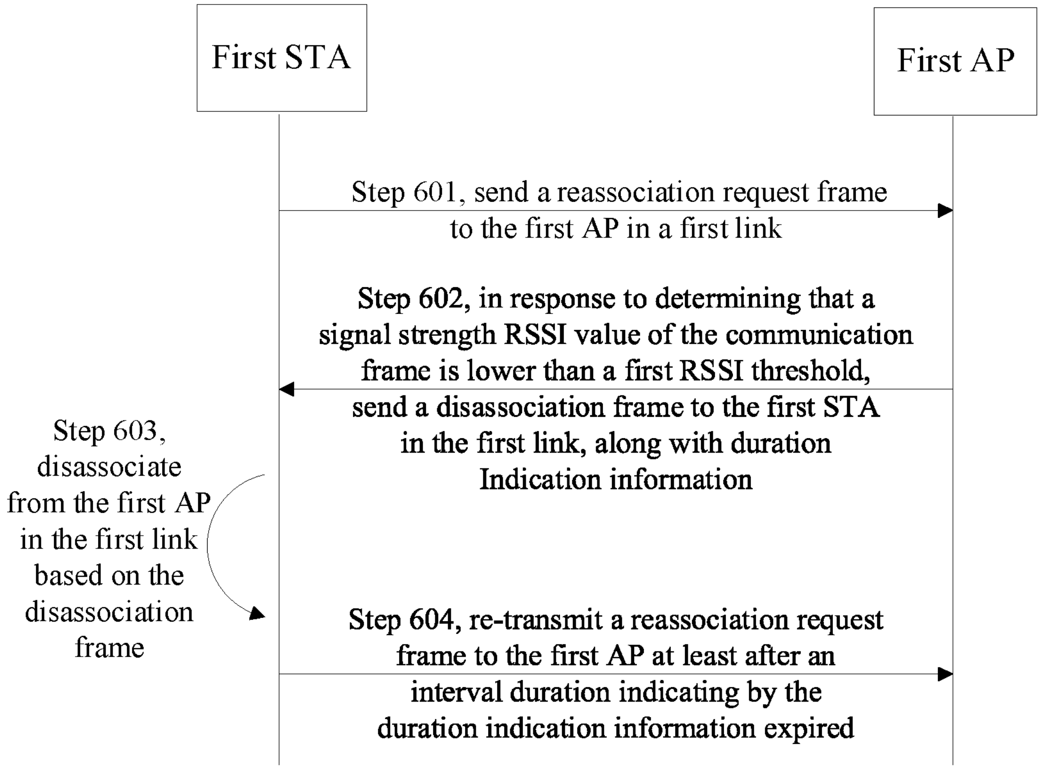
FIG. 6 is a schematic flowchart illustrating another link control method according to an exemplary embodiment.

In some optional embodiments, with reference to FIG. 6, which is a flowchart of a link control method illustrated according to an embodiment, the method may include the following steps.

At step 601, a first STA sends a reassociation request frame to a first wireless AP in a first link.

The first AP is an AP affiliated to an AP MLD.

At step 602, in response to determining that a signal strength RSSI value of the reassociation request frame is lower than a first RSSI threshold, the first AP sends a disassociation frame to the first STA in the first link, along with duration indication information.

The RSSI thresholds involved in the embodiments of the present disclosure all belong to the link level, where the first RSSI threshold is a preset RSSI threshold at the link level corresponding to the current first link, i.e., the first RSSI threshold corresponds only to the first link. If the association relationship(s) between the AP(s) and the STA(s) is to be released subsequently, an association relationship between an AP and an STA in a corresponding link will be disassociated according to an RSSI threshold at the link level, and the association relationships for all links will not be released.

The structure of the disassociation frame may be made reference to FIG. 2A, FIG. 2B, or FIG. 2C.

At step 603, the first STA disassociates from the first AP in the first link based on the disassociation frame.

At step 604, the first STA re-transmits a reassociation request frame to the first AP at least after an interval duration indicating by the duration indication information expired.

In this embodiment, in the case where the disassociation frame is also used to disassociate the second AP from the second STA in the second link, the second STA may disassociate from the second AP in the second link based on the disassociation frame upon receiving the disassociation frame.

In the above embodiment, the problem caused by using the disassociation frame for releasing the association relationship at the MLD level is overcame, the STA can work normally via link(s) in other frequency band(s), and the spectrum utilization rate is improved.

Corresponding to the foregoing embodiments of application function implementation methods, the present disclosure also provides embodiments of application function implementation apparatuses.

Figure 7:
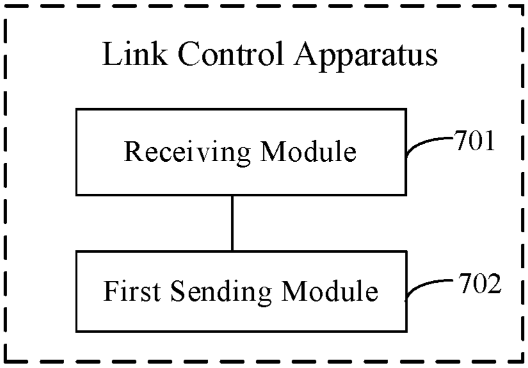
FIG. 7 is a block diagram illustrating a link control apparatus according to an exemplary embodiment.

Referring to FIG. 7, which is a block diagram of a link control apparatus illustrated according to an exemplary embodiment, the apparatus is applied to a first wireless AP, where the first AP is one AP affiliated to an AP MLD, and the apparatus includes:

- a receiving module 701, configured to receive a communication frame sent from a first station (STA) in a first link; and
- a first sending module 702, configured to, in response to determining that a signal strength RSSI value is lower than a first RSSI threshold, send a disassociation frame to the first STA, where the first RSSI threshold is an RSSI threshold corresponding to the first link, and the disassociation frame is at least for disassociating the first AP from the first STA in the first link.

Figure 8:
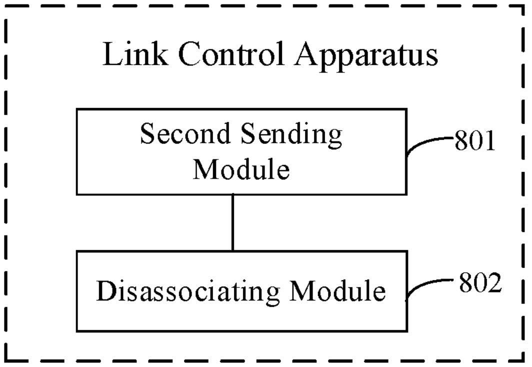
FIG. 8 is a block diagram illustrating another link control apparatus according to an exemplary embodiment.

Referring to FIG. 8, which is a block diagram of a link control apparatus illustrated according to an exemplary embodiment, the apparatus is applied to a first STA, and the apparatus includes:

a second sending module 801, configured to send a communication frame to a first wireless access point (AP) in a first link, the first AP being any one AP affiliated to an AP multi-link device (MLD); and a disassociating module 802, configured to, in response to receiving a disassociation frame from the first AP in the first link, disassociate from the first AP in the first link based on the disassociation frame.

As for the apparatus embodiments, since they substantially correspond to the method embodiments, relevant parts may be referred to the part of the description of the method embodiments. The apparatus embodiments described above are merely illustrative. The units described above as separate components may or may not be physically separated, and the components displayed as units may or may not be physical units, that is, they may be located at a position, or they may be distributed over multiple network units. Some or all of the modules may be selected according to actual requirement to achieve the objectives of the solutions of the present disclosure. One of ordinary skill in the art can understand and implement it without any creative works.

Accordingly, the present disclosure also provides a computer-readable storage medium, the computer-readable storage medium stores a computer program, and the computer program is used to perform any one of the link control methods described above for the AP side.

Accordingly, the present disclosure also provides a computer-readable storage medium, the computer-readable storage medium stores a computer program, and the computer program is used to perform any one of the link control methods described above for the STA side.

Accordingly, the present disclosure also provides a link control apparatus, including:

a processor; and a memory, configured to store instructions executable by the processor;

where the processor is configured to execute any one of the link control methods described above for the AP side.

Figure 9:
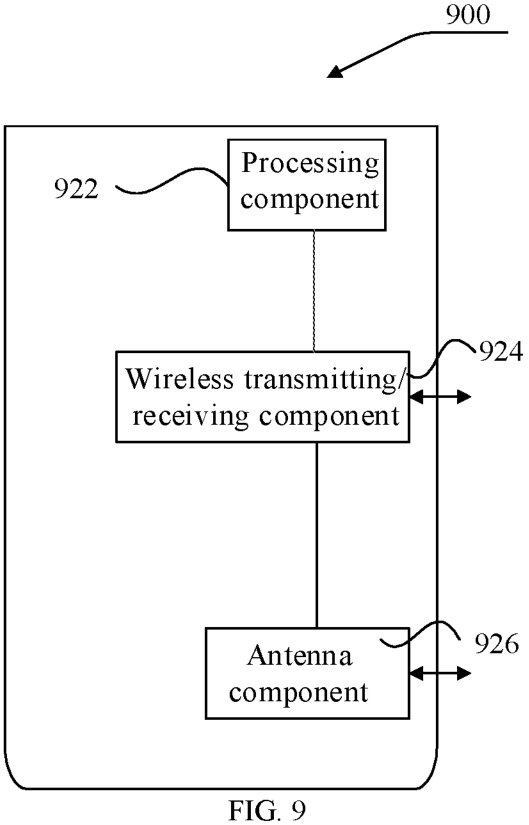
FIG. 9 is a schematic structural diagram illustrating a link control apparatus according to an exemplary embodiment of the present disclosure.

FIG. 9 is a schematic diagram illustrating a structure of link control apparatus 900 according to an embodiment. The link control apparatus 900 may be provided as a first AP. As shown in FIG. 9, the link control apparatus 900 includes a processing component 922, a wireless transmitting/receiving component 924, an antenna component 926, and a signal processing portion specific to a wireless interface. The processing component 922 may further include one or more processors.

One of the processors in the processing component 922 may be configured to perform any one of the above link control methods.

Accordingly, the present disclosure also provides a link control apparatus, including:

a processor; and a memory, configured to store instructions executable by the processor;

where the processor is configured to execute any one of the link control methods described above for the STA side.

Figure 10:
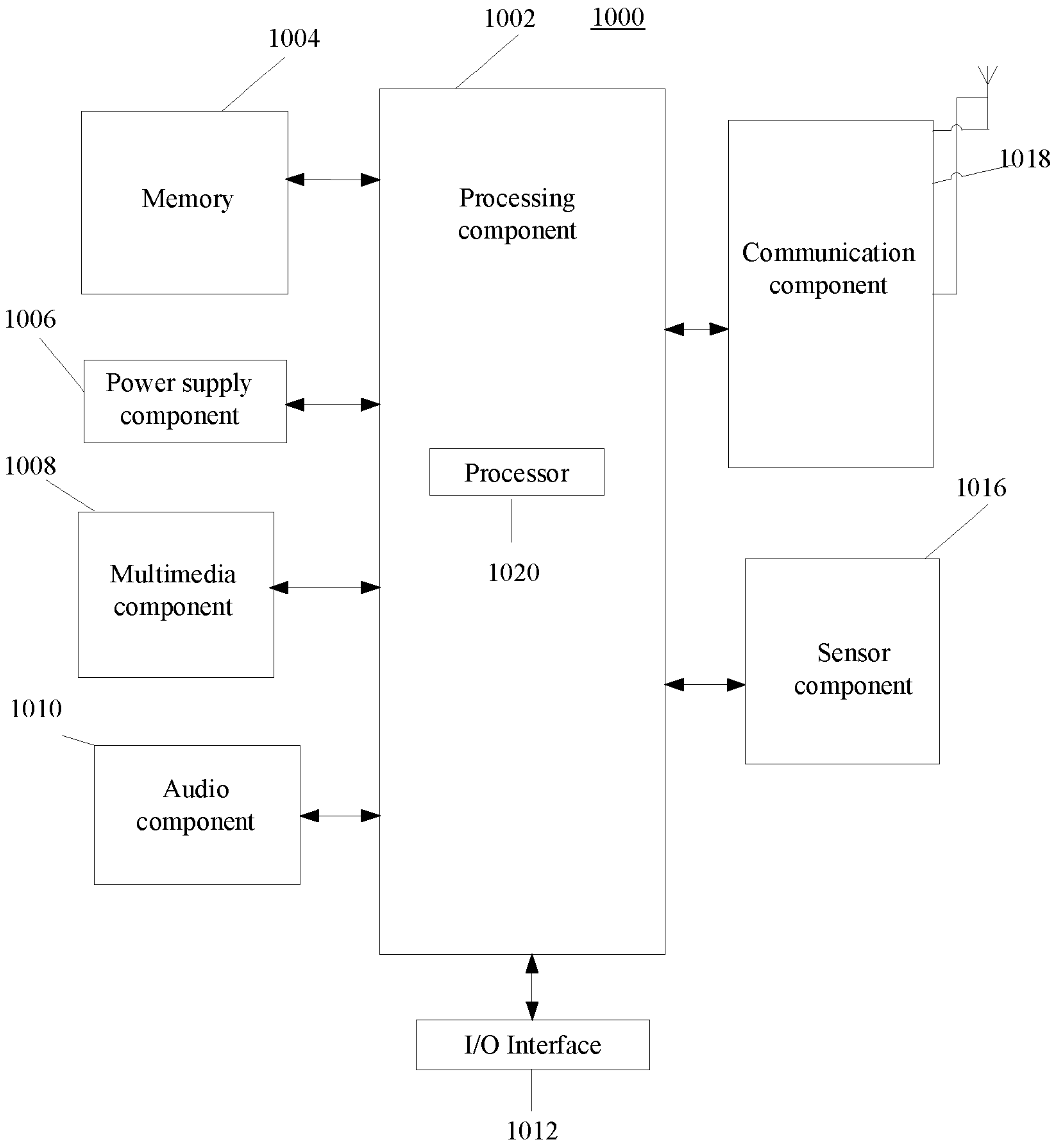
FIG. 10 is a schematic structural diagram illustrating another link control apparatus according to an exemplary embodiment of the present disclosure.

FIG. 10 is a block diagram illustrating link control apparatus 1000 according to an embodiment. For example, apparatus 1000 may be STA, including, but not limited to, terminals such as cell phones, tablets, e-book readers, multimedia playback devices, wearable devices, in-vehicle user devices, pads, smart TVs, and the like.

As shown in FIG. 10, the apparatus 1000 may include one or more of the following components: a processing component 1002, a memory 1004, a power supply component 1006, a multimedia component 1008, an audio component 1010, an input/output (I/O) interface 1012, a sensor component 1016, and a communication component 1018.

The processing component 1002 usually controls overall operations of the apparatus 1000, such as operations associated with display, telephone calls, data communications, camera operations, and recording operations. The processing component 1002 may include one or more processors 1020 to execute instructions to perform all or part of the steps in the link control methods described above. Moreover, the processing component 1002 may include one or more modules to facilitate interaction between the processing component 1002 and other components. For example, the processing component 1002 may include a multimedia module to facilitate interaction between the multimedia component 1008 and the processing component 1002. As another example, the processing component 1002 may read executable instructions from the memory to implement the steps of one of the link control methods provided in the above embodiments.

The memory 1004 is configured to store various types of data to support operations at the apparatus 1000. Examples of such data include instructions for any application or method operating on the apparatus 1000, contact data, phone book data, messages, pictures, videos, and the like. The memory 1004 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or a compact disk.

The power supply component 1006 provides power to various components of the apparatus 1000. The power supply component 1006 may include a power management system, one or more power sources, and other components associated with power generated, managed, and distributed for the apparatus 1000.

The multimedia component 1008 includes a screen that provides an output interface between the apparatus 1000 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1008 includes a front camera and/or a rear camera. When the apparatus 1000 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1010 is configured to output and/or input audio signals. For example, the audio component 1010 includes a microphone (MIC) configured to receive an external audio signal when the apparatus 1000 is in an operation mode, such as a call mode, a recording mode, and a voice recognition mode. The received audio signal may be further stored in the memory 1004 or transmitted via the communication component 1018. In some examples, the audio component 1010 also includes a loudspeaker for outputting an audio signal.

The I/O interface 1012 provides an interface between the processing component 1002 and a peripheral interface module which may be a keyboard, a click wheel, a button, or the like. These buttons may include, but are not limited to a home button, a volume button, a start button, and a lock button.

The sensor component 1016 includes one or more sensors for providing a status assessment in various aspects to the apparatus 1000. For example, the sensor component 1016 may detect an open/closed state of the apparatus 1000, and the relative positioning of components, for example, the component is a display and a keypad of the apparatus 1000. The sensor component 1016 may also detect a change in position of the apparatus 1000 or a component of the apparatus 1000, the presence or absence of a user in contact with the apparatus 1000, the orientation or acceleration/deceleration of the apparatus 1000 and a change in temperature of the apparatus 1000. The sensor component 1016 may include a proximity sensor configured to detect the presence of nearby objects without any physical contact. The sensor component 1016 may also include a light sensor, such as a CMOS or CCD image sensor, for use in imaging applications. In some examples, the sensor component 1016 may also include an acceleration sensor, a gyro sensor, a magnetic sensor, a pressure sensor, or a temperature sensor.

The communication component 1018 is configured to facilitate wired or wireless communication between the apparatus 1000 and other devices. The apparatus 1000 may access a wireless network based on a communication standard, such as Wi-Fi, 2G, 3G, 4G, 5G, or 6G, or a combination thereof. In an example, the communication component 1018 receives broadcast signals or broadcast associated information from an external broadcast management system via a broadcast channel. In an example, the communication component 1018 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 1000 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing any one of link control methods at the STA side described above.

In an embodiment, a non-transitory computer-readable storage medium including instructions is also provided, such as the memory 1004 including instructions. The instructions can be executed by the processor 1020 of the apparatus 1000 to implement the foregoing methods. For example, the non-transitory computer-readable storage medium may be a ROM, a RAM, CD-ROM, a magnetic tape, a floppy disk, an optical data storage device, and so on.

According to a first aspect of the present embodiments of the present disclosure, a link control method is provided, the method is performed by a first wireless access point (AP), the first AP being one AP affiliated to an AP multi-link device (MLD), the method comprising: receiving a communication frame sent from a first station (STA) in a first link; and in response to determining that a signal strength RSSI value is lower than a first RSSI threshold, sending a disassociation frame to the first STA, wherein the first RSSI threshold is an RSSI threshold corresponding to the first link, and the disassociation frame is at least for disassociating the first AP from the first STA in the first link.

Optionally, the disassociation frame is further for disassociating a second AP from a second STA in a second link, the second AP is at least one AP affiliated to the AP MLD, and the second AP is different from the first AP.

Optionally, the disassociation frame at least comprises:

a reason code for indicating lower than the first RSSI threshold and an identification of the first link; and the disassociation frame further comprises:

a reason code for indicating lower than a second RSSI threshold and an identification of the second link, wherein the second RSSI threshold is a preset RSSI threshold corresponding to the second link.

Optionally, the disassociation frame comprises:

a reason code for indicating lower than a preset RSSI threshold corresponding to a link; and a link identification set.

Optionally, bits in the link identification set correspond one-to-one with identifications of links, and a bit value of any one of the bits is used to disassociate an AP from an STA in a corresponding link when the bit value of the bit is a preset value.

Optionally, the communication frame is a reassociation request frame, and the method further comprises:

sending duration indication information to the first STA in the first link, the duration indication information being used to indicate an interval duration for resending the reassociation request frame.

According to a second aspect of the present embodiments of the present disclosure, a link control method is provided, which is performed by a first station (STA), the method comprising:

sending a communication frame to a first wireless access point (AP) in a first link, the first AP being any one AP affiliated to an AP multi-link device (MLD); and in response to receiving a disassociation frame from the first AP in the first link, disassociating from the first AP in the first link based on the disassociation frame.

Optionally, the disassociation frame is further for disassociating a second AP from a second STA in a second link, the second AP is at least one AP affiliated to the AP MLD, and the second AP is different from the first AP.

Optionally, the disassociation frame at least comprises:

a reason code for indicating lower than a first RSSI threshold and an identification of the first link; and the disassociation frame further comprises:

a reason code for indicating lower than a second RSSI threshold and an identification of the second link, wherein the second RSSI threshold is a preset RSSI threshold corresponding to the second link.

Optionally, the disassociation frame comprises:

a reason code for indicating lower than a preset RSSI threshold corresponding to a link; and a link identification set.

Optionally, disassociating from the first AP in the first link based on the disassociation frame comprises:

in response to determining that a bit value of a bit corresponding to the first link in the link identification set is a preset value, disassociating from the first AP in the first link.

Optionally, the communication frame is a reassociation request frame, and the method further comprises:

receiving duration indication information send by the first AP in the first link; and at least after an expiration of an interval duration indicated by the duration indication information, resending the reassociation request frame to the first AP.

According to a third aspect of the present embodiments of the present disclosure, a link control apparatus is provided, applied to a first wireless access point (AP), the first AP being one AP affiliated to an AP multi-link device (MLD), the apparatus comprising:

a receiving module configured to receive a communication frame sent from a first station (STA) in a first link; and a first sending module configured to, in response to determining that a signal strength RSSI value is lower than a first RSSI threshold, send a disassociation frame to the first STA, wherein the first RSSI threshold is an RSSI threshold corresponding to the first link, and the disassociation frame is at least for disassociating the first AP from the first STA in the first link.

According to a fourth aspect of the present embodiments of the present disclosure, a link control apparatus is provided, applied to a first station (STA), the apparatus comprising:

a second sending module configured to send a communication frame to a first wireless access point (AP) in a first link, the first AP being any one AP affiliated to an AP multi-link device (MLD); and a disassociating module configured to, in response to receiving a disassociation frame from the first AP in the first link, disassociate from the first AP in the first link based on the disassociation frame.

According to a fifth aspect of the present embodiments of the present disclosure, a computer-readable storage medium is provided, the computer-readable storage medium storing a computer program, which is used to implement the link control method according to any one of the first aspect.

According to a sixth aspect of the present embodiments of the present disclosure, a computer-readable storage medium is provided, the computer-readable storage medium storing a computer program, which is used to implement the link control method according to any one of the second aspect.

According to a seventh aspect of the present embodiments of the present disclosure, a link control apparatus is provided, comprising:

a processor; and a memory, configured to store instructions executable by the processor;

wherein the processor is configured to execute any one of the link control methods according to the first aspect.

According to an eighth aspect of the present embodiments of the present disclosure, a link control apparatus is provided, comprising:

a processor; and a memory, configured to store instructions executable by the processor;

wherein the processor is configured to execute any one of the link control methods according to the second aspect.

Other implementations of the present disclosure will be apparent to those skilled in the art from consideration of the specification and practice of the present disclosure herein. The present disclosure is intended to cover any variations, uses, modifications or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A link control method, performed by a first access point (AP), the first AP being one AP affiliated to an AP multi-link device (MLD), the method comprising:

receiving a communication frame sent from a first station (STA) in a first link; and in response to determining that a received signal strength indication (RSSI) value is lower than a first RSSI threshold, sending a disassociation frame to the first STA, wherein the first RSSI threshold is an RSSI threshold corresponding to the first link, and the disassociation frame is at least for disassociating the first AP from the first STA in the first link;

wherein the communication frame is a reassociation request frame, and the link control method further comprises:

sending duration indication information to the first STA in the first link, the duration indication information being used to indicate an interval duration for resending the reassociation request frame.

2. The link control method according to claim 1, wherein the disassociation frame is further for disassociating a second AP from a second STA in a second link, the second AP is at least one AP affiliated to the AP MLD, and the second AP is different from the first AP.

3. The link control method according to claim 2, wherein the disassociation frame at least comprises:

a reason code for indicating lower than the first RSSI threshold and an identification of the first link; and the disassociation frame further comprises:

a reason code for indicating lower than a second RSSI threshold and an identification of the second link, wherein the second RSSI threshold is a preset RSSI threshold corresponding to the second link.

4. The link control method according to claim 2, wherein the disassociation frame comprises:

a reason code for indicating lower than a preset RSSI threshold corresponding to a link; and a link identification set.

5. The link control method according to claim 4, wherein bits in the link identification set correspond one-to-one with identifications of links, and a bit value of any one of the bits is used to disassociate an AP from an STA in a corresponding link when the bit value of the bit is a preset value.

6. A non-transitory computer-readable storage medium storing a computer program that when executed by one or more processors, cause causes the one or more processors to collectively perform the link control method according to claim 1.

7. A link control apparatus, comprising:

one or more processors; and a memory, configured to store instructions executable by the one or more processors;

wherein the processors are collectively configured to execute the link control method according to claim 1.

8. The link control apparatus according to claim 7, wherein the disassociation frame is further for disassociating a second AP from a second STA in a second link, the second AP is at least one AP affiliated to the AP MLD, and the second AP is different from the first AP.

9. The link control apparatus according to claim 8, wherein the disassociation frame comprises:

a reason code for indicating lower than the first RSSI threshold and an identification of the first link; or the reason code for indicating lower than the first RSSI threshold, the identification of the first link, a reason code for indicating lower than a second RSSI threshold, and an identification of the second link, wherein the second RSSI threshold is a preset RSSI threshold corresponding to the second link; or a reason code for indicating lower than a preset RSSI threshold corresponding to a link; and a link identification set.

10. A link control method, performed by a first station (STA), the method comprising:

sending a communication frame to a first access point (AP) in a first link, the first AP being any one AP affiliated to an AP multi-link device (MLD); and in response to receiving a disassociation frame from the first AP in the first link, disassociating from the first AP in the first link based on the disassociation frame;

wherein the communication frame is a reassociation request frame, and the link control method further comprises:

receiving duration indication information send by the first AP in the first link; and at least after an expiration of an interval duration indicated by the duration indication information, resending the reassociation request frame to the first AP.

11. The link control method according to claim 10, wherein the disassociation frame is further for disassociating a second AP from a second STA in a second link, the second AP is at least one AP affiliated to the AP MLD, and the second AP is different from the first AP.

12. The link control method according to claim 11, wherein the disassociation frame at least comprises:

a reason code for indicating lower than a first received signal strength indication (RSSI) threshold and an identification of the first link, wherein the first RSSI threshold is a preset RSSI threshold corresponding to the first link; and the disassociation frame further comprises:

a reason code for indicating lower than a second RSSI threshold and an identification of the second link, wherein the second RSSI threshold is a preset RSSI threshold corresponding to the second link.

13. The link control method according to claim 11, wherein the disassociation frame comprises:

a reason code for indicating lower than a preset received signal strength indication (RSSI) threshold corresponding to a link; and a link identification set.

14. The link control method according to claim 13, wherein disassociating from the first AP in the first link based on the disassociation frame comprises:

in response to determining that a bit value of a bit corresponding to the first link in the link identification set is a preset value, disassociating from the first AP in the first link.

15. A non-transitory computer-readable storage medium storing a computer program that when executed by one or more processors, causes the one or more processors to collectively perform, the link control method according to claim 10.

16. A link control apparatus, comprising:

one or more processors; and a memory, configured to store instructions executable by the one or more processors;

wherein the one or more processors are collectively configured to:

send a communication frame from a first station (STA) to a first access point (AP) in a first link, the first AP being any one AP affiliated to an AP multi-link device (MLD); and in response to receiving a disassociation frame from the first AP in the first link, disassociate from the first AP in the first link based on the disassociation frame;

wherein the communication frame is a reassociation request frame, and the one or more processors are further configured to:

receive duration indication information send by the first AP in the first link; and at least after an expiration of an interval duration indicated by the duration indication information, resend the reassociation request frame to the first AP.

17. The link control apparatus according to claim 16, wherein the disassociation frame is further for disassociating a second AP from a second STA in a second link, the second AP is at least one AP affiliated to the AP MLD, and the second AP is different from the first AP.

18. The link control apparatus according to claim 17, wherein the disassociation frame comprises:

a reason code for indicating lower than a first received signal strength indication (RSSI) threshold and an identification of the first link, wherein the first RSSI threshold is a preset RSSI threshold corresponding to the first link; or the reason code for indicating lower than the first RSSI threshold, the identification of the first link, a reason code for indicating lower than a second RSSI threshold, and an identification of the second link, wherein the second RSSI threshold is a preset RSSI threshold corresponding to the second link; or a reason code for indicating lower than a preset RSSI threshold corresponding to a link; and a link identification set.

* * * * *